Sept. 16, 1958 A. HEYDUCK 2,852,614

CIRCUIT ARRANGEMENT FOR P. A. B. X SYSTEMS

Filed Aug. 5, 1955 3 Sheets-Sheet 1

INVENTOR
A. HEYDUCK

BY Robert Harding Jr.

ATTORNEY

Sept. 16, 1958 A. HEYDUCK 2,852,614

CIRCUIT ARRANGEMENT FOR P. A. B. X SYSTEMS

Filed Aug. 5, 1955 3 Sheets-Sheet 2

INVENTOR

A. HEYDUCK

BY Robert Harding Jr.

ATTORNEY

Sept. 16, 1958 A. HEYDUCK 2,852,614

CIRCUIT ARRANGEMENT FOR P. A. B. X SYSTEMS

Filed Aug. 5, 1955 3 Sheets-Sheet 3

INVENTOR

A. HEYDUCK

BY Robert Harding Jr.

ATTORNEY

United States Patent Office 2,852,614

Patented Sept. 16, 1958

2,852,614

CIRCUIT ARRANGEMENT FOR P. A. B. X SYSTEMS

Alfred Heyduck, Stuttgart-Zuffenhausen, Germany, assignor to International Standard Electric Corporation, New York, N. Y., a corporation of Delaware Application August 5, 1955, Serial No. 526,602

Claims priority, application Germany September 4, 1954

7 Claims. (Cl. 179—27)

The invention relates to telephone P. A. B. X systems in which the extensions are connected to the direct exchange lines over connecting links which evaluate the office code differently depending upon the kind of restriction given to the calling extension and in such a way that the unrestricted extensions are automatically connected via these connecting links to an idle direct exchange line, but the partially restricted extensions effect a signalling at the operator's position.

Arrangements are known in which the differently restricted subscribers, e. g. the unrestricted, partially restricted, and completely restricted, use the same office code. An unrestricted subscriber, upon dialling the office code, will be connected through to the exchange via a high-quality connecting line and is enabled to establish the connection; a partially restricted subscriber, upon dialling the office code, will also seize a high-quality connecting line, but the connecting through to the exchange will be prevented, and, instead, a call to the operator's position is initiated. In such an arrangement the connecting-through depends on the discretion of the operator. If the operator, for some reason or other, does not establish the connection, then the already seized direct exchange line remains unnecessarily withdrawn from traffic.

In another previously suggested arrangement, the partially restricted subscriber, upon transmitting the office code, will be connected through via a record operator's line and by means of the dial-impulse receiver to the exchange. When the operator actuates a key (button), then the subscriber will be thrown off the connnecting path and the partially restricted subscribers will become temporarily unrestricted. The subscriber will receive the dial signal via a connecting path that is to be newly seized. He then has to dial the office code again and will then be allotted an idle direct exchange line. The invention avoids the aforementioned disadvantages of the conventional types of arrangements by providing a switching means which, at a transmission of the office code by a partially restricted extension user, effects a signalling at the operator's position without a selecting movement of the seized connecting device which is evaluating the office code.

According to a further embodiment of the invention the connection of the exchange to the seized connecting line is prepared at the same time that the signalling is effected by the transmission of the office code. The connection of the exchange to the seized connecting line is thereby effected through a finder switch which is started by a switching operation performed by the operator and whereby, the calling extension together with this connection, is indicated at the operator's position.

According to a further embodiment of the invention, the exchange, after having been connected to the connecting device may transmit the office code to the connecting device in the course of a switching operation, whereby said connecting device will be placed in the same condition as if an unrestricted extension had transmitted the office code, so that an automatic connection with an idle direct exchange line can now be established via this connecting device. Upon transmission of the restriction identification by the exchange the latter will be automatically disconnected from the connecting device.

In accordance with a further embodiment of the invention, the exchange is capable of acting upon switching means to perform switching operations which cause the seized connecting device to establish an automatic connection with an idle direct exchange line and to impress upon this direct exchange line a long-distance, unrestriction, identification signal.

The invention will now be particularly described with reference to an exemplified embodiment shown in Figs. 1 to 3 of the accompanying drawings wherein:

Figs. 1*a* and 1*b* show a connecting path represented as a dial impulse receiver and the connecting point of the exchange which is allocated as a rule to the connecting paths;

*Establishment of a local or trunk call by an unrestricted subscriber*

Figure 1A:
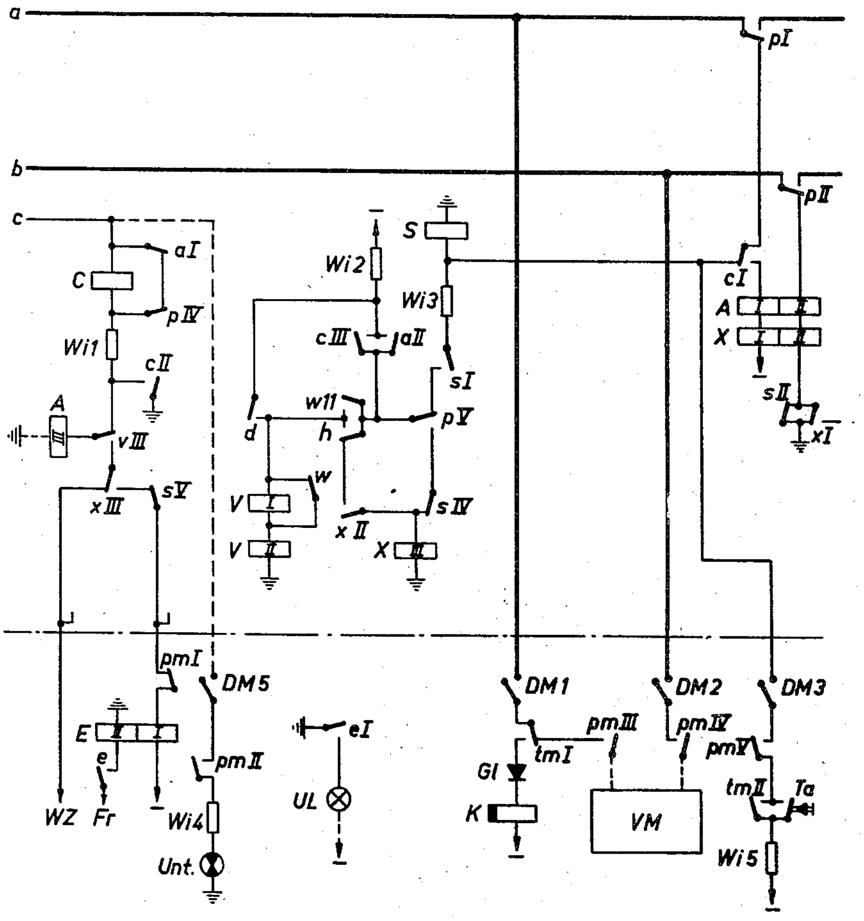
Figure 1B:
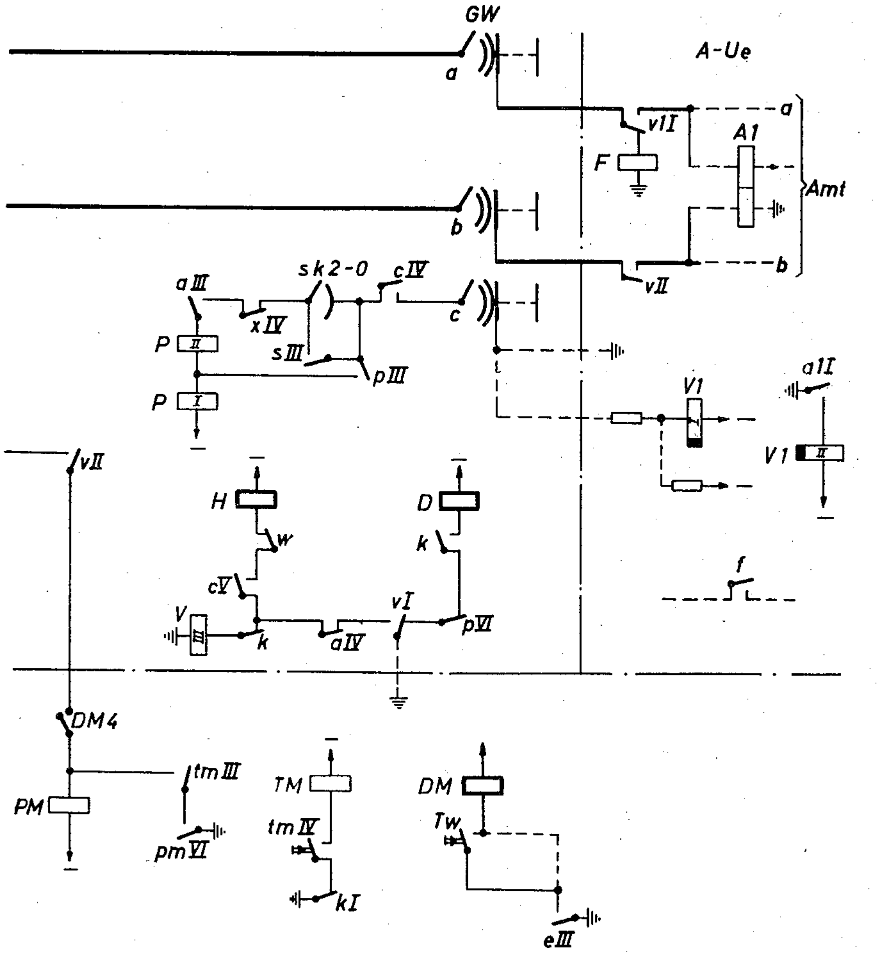
Figure 2:
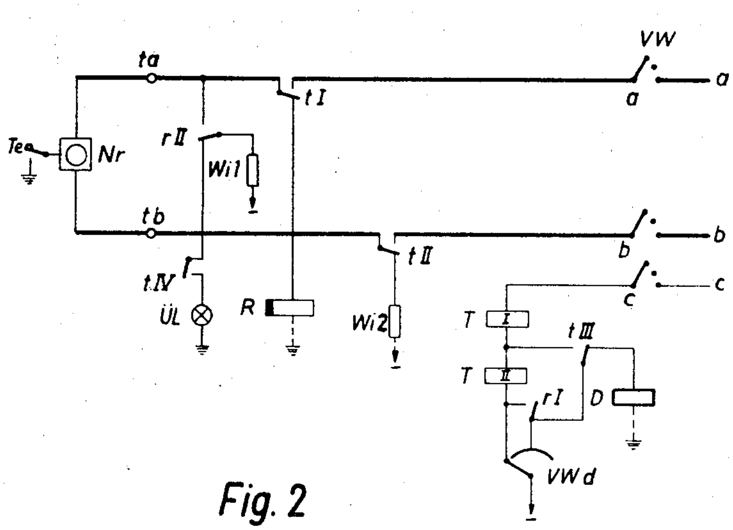
Fig. 2 shows the subscriber circuit of an unrestricted subscriber.

If a completely unrestricted subscriber N*r* (Fig. 2) lifts his handset, the slow release relay R will be energized by the formation of the subscriber loop via minus W*i*2, *t*II, N*r* loop, *t*I, R, plus. This operates drive magnet D via minus, *d* wiper and home contact of preselector VW*d*, *r*I, *t*III, D, plus, and causes the preselecting device VW to perform a hunting action in the conventional manner for an idle connecting path (Fig. 1 GW). When an idle connecting path is found, the relay T in the subscriber circuit and the relay A in the group selector (GW) will be energized via minus, *d*-wiper of the preselector, *r*I, T(II), T(I), *c*-wiper of the preselector VW, *c*-wire leading to the group selector (GW) in Fig. 1*a*, *a*I, *p*IV, W*i*1, A(III), plus.

By the reversal of the contact *t*I (Fig. 2) the circuit for relay R will be interrupted, but the relay does not immediately release. During the release time of the said relay R, a minus potential is being applied to the *a*-wire: minus, W*i*1, *r*II, *t*I, *a*-wiper of the preselector VW, *a*-wire leading to the group selector GW (in Fig. 1*a*), *p*I, *c*I, S, plus.

The unrestriction relay S in the group selector will pull up and will remain energized over its own contact *s*I, minus, W*i*2, *a*III, *p*V, *s*I, W*i*3, plus. By the energization of relay A and the opening of contact *a*I, the relay C will be energized, which, with the aid of its contact *c*I, performs a connecting-through of the feeding bridge A, X to the subscriber over the contacts *p*I and *p*II. Contact *c*V serves to energize relay V(III), via minus, H, W, CV, *k*, VIII. The subscriber will now receive the dial tone from WZ induced from winding AIII, via dial tone at WZ, *x*III, *v*III, AIII.

If the subscriber now intends to establish a local or trunk call, he will have to depress his grounding key T*e*. This will operate differential relay X via minus, XI, AI, *c*I, *p*I, wire *a*, wiper *a* of VW, *t*I, T*e*, plus. Relay X will lock over minus W*i*2, *c*III and *a*II in parallel, *h*, *x*II, plus. Owing to the fact that relay S is energized, the feeding bridge A will be interrupted by contact *x*I upon the pulling up of the differential (difference) relay X. This releases relay A. By the dropping of relay A, the lifting or vertical magnet H will be energized by increased current through its winding via minus, H, W, *c*V, *a*IV, *v*I plus, so that the seized group selector (GW) will perform a vertical step, thus approaching the operating decade (group).

By the attraction of the armature of the vertical magnet

H, the contact $h$ will be reversed, and upon leaving the normal position of the selector, the contact $k$ will be actuated. The winding of the relay V(III) will be de-energized by the opening of contact $k$, but the relay V will remain energized over the windings I and II and via the reversed contact $h$, $c$III, W$i$2, minus. By the reversal of the contact $h$, the holding winding of the relay X(III) is de-energized. By the dropping of this relay, the supply current to the extension station will be restored over the normal side of the contact $x$I, so that the feeding or supply relay A will pull up and the vertical magnet H will be de-energized by the opening of $a$IV. Contact $h$ again returns to the normal position and, consequently, interrupts the circuit for relay V, which drops off accordingly. Contact $v$I completes a circuit for the rotary magnet D of the adjusting selector GW in Fig. 1$b$, via minus, D, $k$, $p$VI, $v$I, plus, at the actuation of which a contact $d$ will close to energize the relay V (I, II) via minus, W$i$2, $d$, VI, VII, plus. Contact $vI$ thereupon interrupts the circuit for the rotary magnet D which releases. Contact $d$ interrupts the circuit for relay V again, so that the rotary magnet D will be re-energized again over contact $v$I.

This reciprocal relation will be repeated until the adjusting selector has hunted for and found an idle office repeater and relay P (I, II) pulls up via minus PI, PII, $a$III, $x$IV, $sk$2–0, $c$IV, $c$ wiper of GW, plus in the idle office repeater, and interrupts the circuit for the rotary magnet D by means of its contact $p$VI. The extension station will now be connected with the direct exchange line over the contacts $p$I, $p$II. The extension user may now establish his desired trunk or local connection in the conventional manner.

*Establishment of a local or trunk call by a partiality restricted subscriber*

Figure 3:
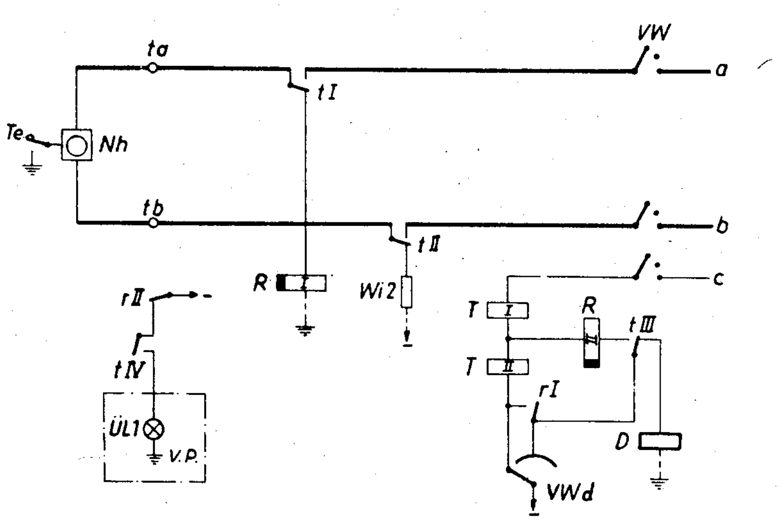
Fig. 3 shows the subscriber circuit of a partially restricted subscriber.

When a partially restricted subscriber N$h$ (Fig. 3) attempts a local or trunk call, the hunting of the preselecting device VW for finding an idle connecting path is effected in the same manner as described already with respect to the unrestricted subscriber. However, now the unrestriction relay S, which is arranged in the seized connecting path, will not pull up because no minus potential is applied to the $a$-wire in the subscriber circuit (Fig. 3) when the T relay operates. The operation of the T relay, however, connects winding II of the R relay in series with winding I of relay T via minus, wiper $d$ of VW, $t$III, RII, TI, wiper $c$ of VW, wire $c$, C, W$i$1, $v$III, AIII, plus, and, since the current through RII is not sufficient to hold R, this relay releases, thus lighting the supervisory lamp UL1 of the partially restricted subscriber via minus, $r$II, $t$IV, UL1, plus.

If the subscriber wishes to establish a local or trunk call, he will depress the grounding key T$e$. The difference relay X, which is provided in the connecting path, will be energized via minus, X1, A1, $c$I, $p$I, wire $a$, wiper $a$ of VW, $t$I, T$e$, plus, and will hold itself over the contact $x$II of its own and its third winding via minus, W$i$2, $c$II and $a$II in parallel, $h$, $x$II, XIII, plus. Inasmuch as relay S did not pull up in the connecting path, the supply circuit in the connecting path will also not be interrupted and the selector, consequently, will not be actuated. A call connection to the operator's position, shown below the dot-and-dash line of Fig. 1, is effected over contact $x$III: plus, A(III), $v$III, $x$III, $s$V, $pm$I, E(I), minus.

This operates relay E which closes its contact $e$ and connects ringing tone from FR across its winding II. The dial tone, which had been switched on at the seizure, will be changed into a ringing tone from F$r$ over relay E by the reversal of the contact $x$III. A lamp UL at the operator's position will be switched on by contact $e$I for indicating to the operator that a partially restricted subscriber intends to express a wish, e. g. the establishment of a local or trunk call. The exchange operator may now connect her position to the respective seized connecting path by actuating the key TW which operates a selector DM, assigned in common to the connecting paths via minus, TW, $e$III, plus. By the energization of the difference relay X the following test path for the selector DM will be completed: plus, $s$II, $x$I, $v$II, DM4, PM, minus.

As soon as the selector has reached the marked point, the relay PM will be energized. The exchange will be connected to the speaking wires of the respective connecting path over the wipers DM1, DM2 and over the contacts $pm$III, $pm$IV. Contact $pm$I will switch off the ringing tone and release relay E which will switch off the supervisory lamp UL. The contact $pm$II applies an amplified current with a flickering rhythm from interrupter U$nt$. to the $c$-wire of the hunted preselecting device over the wiper DM5 in parallel with the current through the winding of relay C, whereby a winding (II) of the call relay R (Fig. 3) will be energized sufficiently in the flickering rhythm to operate relay R of the subscriber's circuit intermittently. Contact $r$II will now cause the supervisory lamp UL1 of the partially restricted subscriber to flicker. Since there is one of these lamps for each subscriber, the operator will be able to recognize with which subscriber the exchange is connected over the connecting device.

If the extension user is authorized to conduct the demanded call, then the operator will depress the key T$a$. The unrestriction relay S will thereby be operated over plus, S, DM3, $pm$V, T$a$, W$i$5, minus, and remains energized over its own contact $s$I via plus, S, W$i$3, ST, $p$V, $c$III and $a$II in parallel, W$i$2, minus. The same condition is thereby established in the connecting path as is the case when the office code is being transmitted by a completely unrestricted subscriber. All of the further switching operations or processes, such as the momentary interruption of the feeding bridge, actuation of the vertical magnet H, are effected in the same manner, as has been described hereinbefore with respect to the establishment of a local or trunk call by an unrestricted subscriber. It remains to be added that by the opening of the contact $h$ during the first vertical step, the relay X will be de-energized and, with its contact $x$I, interrupts the circuit for relay PM of the common connecting device. In this manner the exchange (indicated at VM, Fig. 1$a$) is released at contacts $pm$III and $pm$IV from the talking wires $a$ and $b$.

It is possible to transmit a special indicating signal, e. g. a long-distance unrestriction identification signal, to the office repeater, after having hunted for and found the selector that is assigned to the respective connecting path, by the actuation of a key $tm$IV which holds itself actuated over its own magnet TM. A minus potential will be applied to the $a$-wire over minus, K, G1, $tm$I, DM1, $a$-wire. As soon as the selector (GW) has hunted for and found an idle direct exchange line, the relay F will be automatically energized. This relay is provided in the office repeater for indicating the long-distance unrestriction identification minus, K, G1, $tm$I, DM1, $p$I, $a$-wiper of the group selector (GW) $v$II, F, plus. Over a contact $f$, a long-distance, unrestriction, identification will be prepared in the office repeater. The disconnection of the common connecting device is effected by the delayed energization of relay K in the abovementioned circuit. Contact $k$I interrupts the circuit for relay TM, whereby contact $tm$III causes the de-energization of relay PM. The exchange, thereby, is again disconnected from the common connecting device.

What is claimed is:

1. A circuit arrangement for P. A. B. X systems comprising an operator's position, a plurality of lines, a plurality of connecting circuits adapted to be seized by calling lines for connecting said calling lines to exchange lines, means at each line for seizing an idle connecting circuit, means at each of certain of said lines which are permitted unrestricted service responsive to the seizure of a connecting circuit by said line for automatically transmitting a signal to said connecting circuit, first means at said connecting circuit responsive to said signal for preparing said circuit for seizing an idle exchange line, means at each line under control of the subscriber for transmitting another signal to said connecting circuit, second means at each connecting circuit responsive to said other signal and under control of said first-signal-responsive means for alternatively causing said connecting means to seize an exchange line if said first-mentioned signal has been received or to transmit a signal to said operator's position if said first-mentioned signal has not been received.

2. A circuit arrangement for P. A. B. X systems, as defined in claim 1, further comprising manually operated means at the operator's position for causing a connecting circuit to seize an exchange line after said operator's position has been signalled.

3. A circuit arrangement for P. A. B. X systems, as defined in claim 2, in which the means for alternatively causing the connecting circuit to seize an exchange line or to signal the operator's position comprises a finder switch for connecting said operator's position to said connecting circuit, and means responsive to the signal received at said operator's position for causing said finder switch automatically to hunt for and find the connecting circuit.

4. A circuit arrangement for P. A. B. X systems as defined in claim 3, further comprising means at the operator's position responsive to the finder switch having found the connecting circuit for indicating the identity of the calling line to the operator.

5. A circuit arrangement for P. A. B. X systems, as defined in claim 2, in which the means for causing a connecting circuit to seize an exchange line after the operator's position has been signalled comprises key means and means responsive to the operation of said key means for operating the first means at the connecting circuit for preparing said circuit for seizing an idle exchange line.

6. A circuit arrangement for P. A. B. X systems, as defined in claim 5, further comprising means for automatically disconnecting the key means from the connecting circuit in response to the operation of the first means for preparing the circuit for seizing an idle exchange line.

7. A circuit arrangement for P. A. B. X systems, as defined in claim 2, further comprising manually operable means at the operator's position for transmitting a long-distance, unrestriction, identification signal over a seized exchange line.

References Cited in the file of this patent

UNITED STATES PATENTS

| | | |
|---|---|---|
| 1,919,317 | Burgener | July 25, 1933 |
| 2,714,630 | Nilsson | Aug. 2, 1955 |